US011645472B2

(12) United States Patent
Cornpropst et al.

(10) Patent No.: US 11,645,472 B2
(45) Date of Patent: May 9, 2023

(54) CONVERSION OF RESULT PROCESSING TO ANNOTATED TEXT FOR NON-RICH TEXT EXCHANGE

(71) Applicant: International Business Machines Corporation, Armonk, NY (US)

(72) Inventors: Jason Howard Cornpropst, Raleigh, NC (US); Willie Robert Patten, Jr., Hurdle Mills, NC (US)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 17/005,617

(22) Filed: Aug. 28, 2020

(65) Prior Publication Data
US 2022/0067297 A1 Mar. 3, 2022

(51) Int. Cl.
G06F 17/00 (2019.01)
G06F 40/284 (2020.01)
G06F 40/35 (2020.01)
G06F 40/56 (2020.01)

(52) U.S. Cl.
CPC ............ G06F 40/35 (2020.01); G06F 40/284 (2020.01); G06F 40/56 (2020.01)

(58) Field of Classification Search
CPC ......... G06F 40/35; G06F 40/56; G06F 40/284
See application file for complete search history.

(56) References Cited

U.S. PATENT DOCUMENTS

| 8,849,930 | B2 | 9/2014 | Jonsson |
| 8,903,714 | B2 | 12/2014 | Quast et al. |
| 9,009,687 | B2 | 4/2015 | Caira et al. |
| 9,282,202 | B2 | 3/2016 | Gowen et al. |
| 9,330,192 | B1 | 5/2016 | Greenberg et al. |
| 10,073,830 | B2 | 9/2018 | Walia et al. |
| 10,235,681 | B2 | 3/2019 | Chang et al. |
| 2004/0243926 | A1* | 12/2004 | Trenbeath ............. G06F 40/154 715/239 |
| 2008/0091784 | A1* | 4/2008 | Sundstrom ............ G06F 40/126 709/206 |
| 2010/0211866 | A1* | 8/2010 | Nicholas ............... G06F 40/109 715/234 |
| 2011/0078617 | A1* | 3/2011 | Kumagai .............. G06F 3/0482 715/780 |
| 2013/0024765 | A1* | 1/2013 | Jaquinta ................ G06F 40/151 715/242 |

(Continued)

FOREIGN PATENT DOCUMENTS

EP 2595072 A1 5/2013
WO 2013110288 A1 8/2013

OTHER PUBLICATIONS

US 9,928,293 B2, 03/2018, Chang (withdrawn)
Javascript Object Notation (JSON), www.wikipedia.com/JSON; [online] retrieved from "www.archive.org", archive date: 2019. (Year: 2019).*

(Continued)

Primary Examiner — Jialong He
(74) Attorney, Agent, or Firm — Scully, Scott, Murphy & Presser, P.C.

(57) ABSTRACT

A method and or system for processing a response message from an analytical application that includes receiving the response message; parsing the response message to facilitate selecting a semantic model to translate the response message; obtaining the semantic model to translate the response message; translating the response message using the semantic model; and converting the translated response message to non-rich text. The non-rich text can be annotated for semantic meaning that can be displayed for example on a "dumb" display that does not support rich-text formats.

13 Claims, 10 Drawing Sheets

"This claim seems suspicious due to similarity to a related claim"

"This [CLAIM] seems [SUSPICIOUS] due to similarity to a [RELATED CLAIM]"

(56) References Cited

U.S. PATENT DOCUMENTS

| | | | |
|---|---|---|---|
| 2013/0086100 A1* | 4/2013 | de Cerqueira Gatti | ...................... G06F 16/88 707/E17.127 |
| 2014/0207826 A1* | 7/2014 | Gao | ........................ G06F 16/84 707/803 |
| 2015/0121183 A1 | 4/2015 | Saund et al. | |
| 2019/0349321 A1* | 5/2019 | Cai et al. | ................. H04L 51/02 709/206 |
| 2021/0056263 A1* | 2/2021 | Xia et al. | .............. G06F 40/284 704/9 |

OTHER PUBLICATIONS

Lin, Y. "Semantic Annotation for Process Models: Facilitating Process Knowledge Management via Semantic Interoperability." Norwegian University of Science and Technology. Mar. 2008. 259 pages.

Bartusiak et al. "Semantic Processing for the Conversion of Unstructured Documents into Structured Information in the Enterprise Context." SEMANTiCS 2016. ResearchGate: https://www.researchgate.net/publication/309029642. Sep. 2016. 5 pages.

Slimani, T. "Semantic Annotation:The Mainstay of Semantic Web." International Journal of Computer Applications Technology and Research. Dec. 2013. vol. 2: 6. 8 pages.

Anonymous. "A System and Method for Annotation of Semantic Relations that Span Multiple Documents." IP.com, https://ip.com/IPCOM/000231089. Sep. 25, 2013. 4 pages.

Anonymous. "Ranking Search Results Returned from Multiple Search Engines based on a Semantic Model." IP.com, https://ip.com/IPCOM/000216636. Apr. 11, 2012. 7 pages.

* cited by examiner

"This claim seems suspicious due to similarity to a related claim"

"This [CLAIM] seems [SUSPICIOUS] due to similarity to a [RELATED CLAIM]"

CONVERSION OF RESULT PROCESSING TO ANNOTATED TEXT FOR NON-RICH TEXT EXCHANGE

This disclosure relates generally to methods, systems, platforms, and/or devices for improved data management, and information handling and processing. More specifically, the present disclosure relates to systems, platforms, devices, and/or methods for converting contextual information from, for example, analytical processing, to natural language sentences without rich-text, e.g., with non-rich text, that in an aspect retains semantic meaning through annotation.

The use of electronic data storage is widespread. The relatively rapid increase in the amount of electronic data being created requires storage and management of a large volume of electronic data. Large computer systems and network storage allow users to store and process large collections of data. Users and organizations that deal with significant quantities of digital information often have difficulty managing, searching, processing, and analyzing data in an efficient and intuitive manner. An inability to easily store, organize, search, locate, and manage data can translate into significant inefficiencies and lost opportunities.

In order to make good use of data, data needs to be efficiently searchable and the results of those searches need to be output in a number of different forms. Intelligent output and display of results from searching applications, such as for example, artificial intelligence and machine learning models, often requires conversion and/or translation into sentences, preferably natural language sentences. The display of the sentence is usually in the form of Hyper Text Mark-up Language (HTML) or other rich-text framework to convey semantic meaning. For devices and/or applications that do not support rich-text, e.g., do not support HTML, there is no easy way to show the results, making such results unusable and basically unavailable to the organization. For example there is no easy way to convert analytical processing results into natural language sentences in non-rich text that conveys contextual information and/or semantic meaning.

SUMMARY

The summary of the disclosure is given to aid understanding of data storage or information handling systems, platforms, devices, their architectural structures, and their methods of processing, managing, and/or handling data and metadata residing on data storage systems, including the use, translation, and/or conversion of search and processing results, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the information handling or processing systems, platforms, devices, their architectural structures, and their methods of operation to achieve different effects.

Methods, techniques, processes, systems, platforms, devices, programming instructions, and/or media containing program instructions, are disclosed for managing, processing, converting, translating and/or using electronic data, including in an embodiment converting results of searches and applications, including contextual information from such searches and applications, into a natural language, e.g., sentences, suitable for use on devices and/or for applications that do not support and cannot display rich-text. The natural language non-rich text sentences in one or more embodiments are annotated to provide semantic meaning. In one or more embodiments, a method, system, platform, and/or device for processing a response message from an analytical application is disclosed where the method includes: receiving the response message; parsing the response message to facilitate selecting a semantic model to translate the response message; obtaining the semantic model to translate the response message; translating the response message using the semantic model; and converting the translated response message to non-rich text. In an aspect, the method, system, platform, and/or device further includes annotating the non-rich text for semantic meaning, and preferably reordering the non-rich text by for example a Sorter. In one or more embodiments, the system, platform, and/or device includes a processor for processing programming instructions. The processor can be in a Converter or separate from the Converter where the Converter converts an incoming response message to a natural language, non-rich text sentence. The Converter in one or more embodiments includes one or more of a Translator for separating tokens for providing semantic meaning from the incoming response message; a Semantic Model Determination Module for selecting a semantic model for processing the incoming response message; and a Semantic Model Processor to convert the incoming response to natural language non-rich text sentences.

In an embodiment, the response message is parsed, for example by a Translator or Parser (e.g., a JSON Parser), to separate tokens providing the semantic meaning from a JSON string. The response message, from for example a machine-learning or artificial intelligence model or application, in one or more embodiments includes at least one of the group consisting of a JSON string, a JSON object, a key to locate a JSON string, a key to locate a JSON object, and combinations thereof. The method, system, platform, and/or device in one or more aspects receives, provides, or obtains a JSON string and separates tokens in the JSON string representing the semantic meaning from a sentence for use or display. In an aspect, the method, system, platform, and/or device determines whether the response message contains a JSON string, and in response to the incoming message not containing the JSON string, retrieves the JSON string or an appropriate key. In an embodiment a Lexical Analyzer or Lexical Tokenizer determines what type of data is contained in the incoming response message and based upon the type of incoming response message applies a different analyzer to determine what pieces are important so that a semantic model can be selected.

The method, system, platform, and/or device in one or more aspects selects, by for example the Semantic Model Determination Module, a specialized semantic model based upon the response message from for example a semantic model repository, and/or a default semantic model can be used. Converting the response message to non-rich text in an embodiment includes forming natural language sentences. The Semantic Model Processor in an embodiment includes a Conversion Module for converting the incoming JSON string to at least a portion of a natural language sentence, and a Target Sentence Generator for generating the final target natural language non-rich text sentences annotated for semantic meaning, the Semantic Model Processor configured to create natural language non-rich text sentences annotated for semantic meaning. In one or more embodiments, the method, system, platform, and/or device further includes looking up and translating, for example in a Translation Unit, a JSON string associated with the response message, for example by the Semantic Model Processor, and in a further aspect, converting the translated JSON string based upon the semantic model and the response message. The Semantic Model Processor optionally includes an Options Controller for determining, selecting, and/or facilitating the options available for annotating the non-rich text, text "blob", for semantic meaning. The converted non-rich text as natural language sentence with annotations for semantic meaning is output, for example from the Semantic Model Processor and/or converter, and delivered for display to for example a "dumb" display.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features and embodiments of data storage or information handling systems, platforms, devices, their architectures, and the managing, processing, and/or converting of analytical processing and searching results, will be better understood when read in conjunction with the figures provided. Embodiments are provided in the figures for the purpose of illustrating aspects, features, and/or various embodiments of the systems, platforms, devices, programming instructions, and/or media containing programming instructions for processing, managing, and/or converting analytical processing and search results, for example machine-learning and/or artificial intelligence model responses, but the claims should not be limited to the precise arrangement, structures, features, aspects, assemblies, subassemblies, systems, platforms, circuitry, embodiments, devices, methods, and/or processes shown, and the arrangements, structures, assemblies, subassemblies, systems, platforms, devices, features, aspects, circuitry, embodiments, methods, and/or processes shown may be used singularly or in combination with other arrangements, structures, assemblies, subassemblies, systems, platforms, features, aspects, circuitry, embodiments, devices, methods, and/or processes.

DETAILED DESCRIPTION

Figure 1:
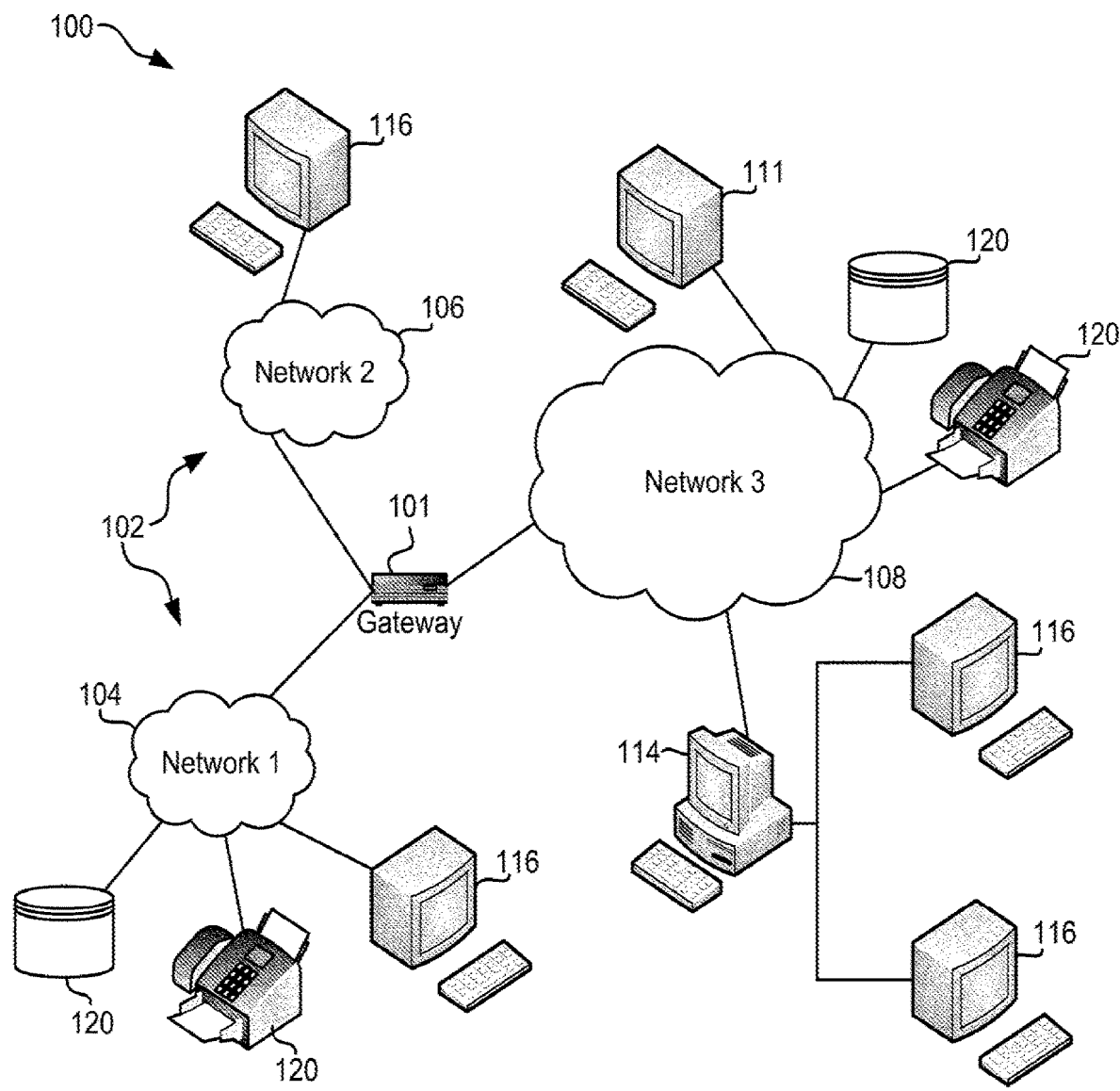
FIG. 1 depicts one example of a data processing or information handling system, also considered a computing environment, according to an embodiment of the present disclosure.

The following description is made for illustrating the general principles of the invention and is not meant to limit the inventive concepts claimed herein. In the following detailed description, numerous details are set forth in order to provide an understanding of information handling systems, platforms, devices, their architectural structures, and/or methods of operation, including the processing, managing, converting, and/or translation of analytical processing or searching results (of data and/or metadata), however, it will be understood by those skilled in the art that different and numerous embodiments of the information handling system, platforms, devices, their architectural structure, and/or methods of operations, including the processing, managing, converting and/or translating of results and/or responses from searching and processing applications and/or programs can be practiced without those specific details, and the claims and disclosure should not be limited to the embodiments, structures, mechanisms, functional units, circuitry, assemblies, subassemblies, features, systems, platforms, devices, processes, methods, aspects, features or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "content" or "data" means any computer-readable data including, but not limited to, digital photographs, digitized analog photos, music files, video clips, text documents, interactive programs, web pages, word processing documents, computer assisted design files, blueprints, flowcharts, invoices, database reports, database records, spread sheets, charts, tables, graphs, video game assets, sound samples, transaction log files, tables, electronic documents, files which simply name other objects, and the like. Data may include structured data (e.g., database files and objects), unstructured data (e.g., documents), and/or semi-structured data.

As used herein, the term "metadata" refers to any descriptive or identifying information in computer-processable form that is associated with particular content, data, or a data set. Generally speaking, content will have metadata that is relevant to a number of characteristics of the content and/or the overall content collection, including, but not limited to, the content's technical aspects (format, bytes used, date of creation), the workflow in which the content participates (creator, owner, publisher, date of publication, copyright information, etc) and the subject matter of the content (the nature of the sound of an audio file, be it music or a sound-effect, the subject of a photograph or video clip, the abstract of a lengthy text document, excerpted particulars of invoices or other data-interchange format files). For example, metadata items may include but are not limited to one or more of the following: the content owner (e.g., the client or user that generates the content), the creation time (e.g., creation time stamp), the last modified time (e.g., timestamp of the most recent modification of data), a data set name (e.g., a file name), a data set size (e.g., number of bytes of data set), information about the content (e.g., an indication as to the existence of a particular search term), table names, column headers including column family and column name, names user-supplied or custom metadata tags, to/from information for email (e.g., an email sender, recipient, etc.), creation date, file type (e.g., format or application type), last accessed time, application type (e.g., type of application that generated the data block), location/network (e.g., a current, past or future location of the data set and network pathways to/from the data block), geographic location (e.g., GPS coordinates), frequency of change (e.g., a period in which the data set is modified), business unit (e.g., a group or department that generates, manages or is otherwise associated with the set), aging information (e.g., a schedule, such as a time period, in which the data set is migrated to secondary or long term storage), boot sectors, partition layouts, file location within a file folder directory structure, user permissions, owners, groups, access control lists (ACLS), system metadata (e.g., registry information), combinations of the same or the other similar information related to the data set. The term "metadata tag", or "metadata attributes" (also referred to as custom metadata tags or attributes) refers to any descriptive or identifying information in computer-processable form that is associated with particular metadata, and that is indicative of the actual information or the content included in various data storage systems and with which the metadata is associated. A metadata tag is also referred to as metadata attributes.

As used herein, "results", "search results", "responses", "output" and the like includes the output, results, and/or response, including "data" and "metadata", from applications, programs and/or models, including, for example, artificial intelligence and/or machine learning models, applications, and/or programs. "Non-rich text" as used herein refers to text corresponding to the characters on a keyboard, while "rich-text" refers to annotations or changes to the text corresponding to characters on a keyboard. For example, rich text includes text that is bolded, italicized, underlined, highlighted, striked-out, hyperlinks, etc., whereas non-rich text would include parentheticals, quotation marks, questions marks, explanation marks and other characters that are found on a typical keyboard. The above examples are exemplary and are non-limiting as there are other examples of rich text and non-rich text.

The following discussion omits or only briefly describes conventional features of information processing systems, platforms, devices, their architectural structures, and/or methods of operation, including the processing, managing, and/or converting of processing results, e.g., machine-learning and/or artificial intelligent model responses and/or results, which are apparent to those skilled in the art. It is assumed that those skilled in the art are familiar with the general architecture of data and information handling systems, computer-implemented platforms, devices, their architectural structures, and/or their methods of operations, including the processing, managing, and/or converting of search and analytical processing results, including the use and application of artificial intelligence and machine learning models, applications and/or programs, and the conversion, translation, processing, and/or managing of their results and/or responses. It may be noted that a numbered element is numbered according to the figure in which the element is introduced, and is typically referred to by that number throughout succeeding figures.

Systems, platforms, computer program products, devices, and/or methods according to one or more embodiments for processing, managing, searching, converting and/or translating application results and/or responses are disclosed. In one or more embodiments, systems, methods and/or techniques are disclosed by which results and/or responses from applications, including contextual information, for example, from analytical processing programs/applications, e.g., artificial intelligence and/or machine learning models, are converted and/or translated into a natural language sentence suitable for transmission and/or display in a non-rich text manner. For example, program and application results and responses can be converted and/or translated into natural language, e.g., sentences, having annotated text for semantic meaning without the use of rich text. In one or more embodiments, the natural language sentences with annotated text for semantic meaning are for display and/or use on a "dumb" terminal that can only utilize and display a text "blob", e.g., non-rich text.

Output, results, and/or responses from applications, including for example analytical processing applications and/or programs, e.g., artificial intelligence and/or machine learning models, typically provide the data and a base understanding as to the rationale for the results and/or model. For example, the results of the analytical processing program or application, e.g., the machine-learning model, can be in multiple parts where the first part comprises the data, and the second part identifies the most important features and/or columns that supply the rationale for the results. That output, including the rationale and explanation of the results and/or response, is typically in a Java Script Object Notation (JSON) type format (e.g., a JSON formatted string). Intelligent display of that response or results generally requires conversion and/or translation into sentences (natural language), which in one or more embodiments can also require restructuring of the natural language sentence. The display of the sentence is usually in the form of Hyper Text Mark-up Language (HTML) or other rich-text framework. For devices and/or applications that do not support rich-text, e.g., "dumb" terminals that support only text "blobs", there is no easy way to show, display, and/or use the results, e.g., semantic results, having a rich text format. Current methods of converting the results of such analytical programs and/or applications, e.g., machine learning or artificial intelligence output, into natural language, e.g., sentences, while maintaining context information, e.g., rationale/explanation for the results, typically requires a custom implementation as there is no standard process nor common solution.

Systems, platforms, techniques, methods, and processes are disclosed by which the results, e.g., from analytical processing applications and/or programs, e.g., machine learning and/or artificial intelligence models/programs, including contextual information can be converted/interpreted into natural language (for example, English) sentences suitable for non-rich text implementation. In one or more embodiments, the results are converted into non-rich, annotated, natural language text/sentences that are suitable for transmission to and/or display on a device (or application) that is not capable of displaying rich text.

Turning to the environments in which the systems, platforms, methods, and/or techniques have potential application, FIG. 1 illustrates architecture 100 of a data processing or information handling system, also referred to as a computer network system, in accordance with an embodiment. As shown in FIG. 1, a plurality of remote networks 102 are provided including a first remote network 104 and a second remote network 106. A gateway 101 may be coupled between the remote networks 102 and a proximate network 108. In the context of the architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer, smartphone, or any other type of logic device. It should be noted that in an embodiment a user device 111 may also be directly coupled to any of the networks. It should be noted that in one or more embodiments user devices 116 and/or 111 may be a dumb terminal, e.g., a terminal that can only display and/or utilize a text blob.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
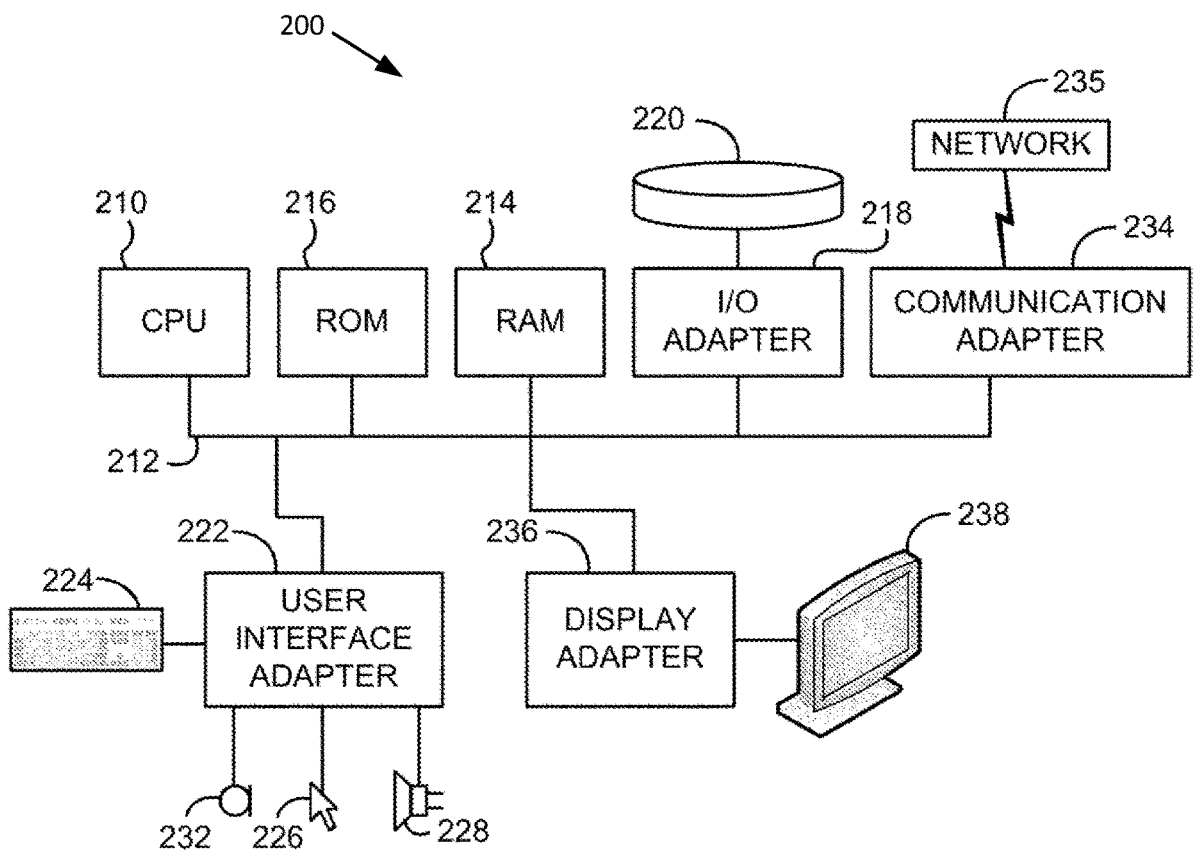
FIG. 2 is a functional block diagram illustrating a data processing or information handling system, according to an embodiment of the present disclosure.

FIG. 2 shows a representative hardware environment associated with a user device 116, user device 111, and/or server 114 of FIG. 1, in accordance with an embodiment. Such figure illustrates an example hardware configuration of a user device/workstation 200 having a central processing unit 210, such as a microprocessor, and a number of other units interconnected via a system bus 212.

The user device/workstation 200 shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), MAC OS, UNIX OS, etc. It will be appreciated that a preferred embodiment may also be implemented on platforms and operating systems other than those mentioned. An embodiment may be written using XML, C, and/or C++ language, or other programming languages, along with an object oriented programming methodology. Object oriented programming (OOP), which has become increasingly used to develop complex applications, may be used.

Figure 3:
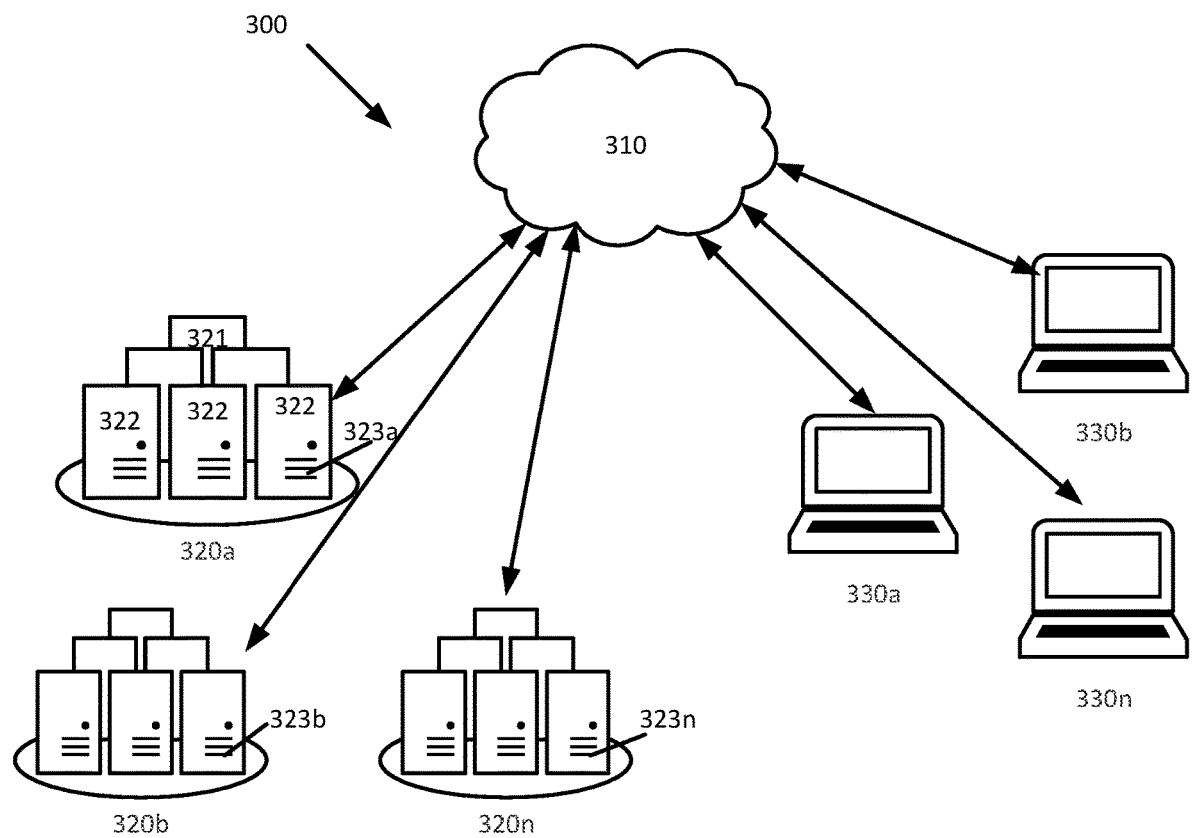
FIG. 3 depicts an example block diagram of an information and data storage/management system, according to an embodiment of the present disclosure.

Referring now to FIG. 3, there is illustrated an example block diagram of an information management system 300 that includes a set of networked data storage systems 320a, 320b . . . 320n and client devices 330a, 330b . . . 330n in communication via a data network 310 and in accordance with implementations of this disclosure. It can be appreciated that the implementations disclosed herein are not limited by the number of storage devices or data storage systems attached to data network 310. It can be further appreciated that storage devices or data storage systems attached to data network 310 are not limited by communication protocols, storage environment, physical location, etc.

In one embodiment, each data storage system 320a, 320b . . . 320n may include a storage subsystem 321 and storage devices 322. The storage subsystem 321 may comprise a storage server or an enterprise storage server, such as the IBM Enterprise Storage Server®. (IBM and Enterprise Storage Server are registered trademarks of IBM). The storage devices 322 may comprise storage systems known in the art, such as a Direct Access Storage Device (DASD), Just a Bunch of Disks (JBOD), a Redundant Array of Independent Disks (RAID), a virtualization device, tape storage, optical disk storage, or any other data storage system. In certain embodiments, multiple storage subsystems may be implemented in one storage subsystem 321 and storage devices 322, or one storage subsystem may be implemented with one or more storage subsystems having attached storage devices. In an embodiment, data and metadata corresponding to contents of the storage systems 320a, 320b . . . 320n is collected and stored. Other types of information that generally provides insights into the contents of the storage systems 320a, 320b . . . 320n can also be stored.

In certain embodiments, client devices 330a, 330b . . . 330n may be general purpose computers having a plurality of components. These components may include a central processing unit (CPU), main memory, I/O devices, and data storage devices (for example, flash memory, hard drives and others). The main memory may be coupled to the CPU via a system bus or a local memory bus. The main memory may be used to provide the CPU access to data and/or program information that is stored in main memory at execution time. Typically, the main memory is composed of random access memory (RAM) circuits. A computer system with a CPU and main memory is often referred to as a host system. The client devices 330a, 330b . . . 330n can have at least one operating system (e.g., Microsoft Windows, Mac OS X, iOS, IBM z/OS, Linux, other Unix-based operating systems, etc.) installed thereon, which may support or host one or more file systems and other applications. An example of client devices 330a, 330b, . . . 330n is shown as user device/workstation 200 in FIG. 2, although it can be appreciated that client devices 330 can include more or less components and systems than user device/work station 200. It can be appreciated further that client devices 330a, 330b, . . . 330n can include user devices 111, user devices 116, and/or servers 114.

The data storage systems 320a, 320b . . . 320n and client devices 330a, 330b . . . 330n communicate according to well-known protocols, such as the Network File System (NFS) or the Common Internet File System (CIFS) protocols, to make content stored on data storage systems 320a, 320b . . . 320n appear to users and/or application programs as though the content were stored locally on the client systems 330a, 330b . . . 330n. In a typical mode of operation, the client devices 330a, 330b . . . 330n transmit one or more input/output commands, such as an NFS or CIFS request, over the computer network 310 to the data storage systems 320a, 320b . . . 320n, which in turn issues an NFS or CIFS response containing the requested content over the network 310 to the respective client devices 330a, 330b . . . 330n. The response, output, and/or search result from such operations, for example, results from machine learning and/or artificial intelligence programs, can be subject to further processing, including conversion and/or translation, as described below.

The client devices 330a, 330b . . . 330n may execute (internally and/or externally) one or more applications, which process, handle, manipulate, and/or generate the content on the one or more data storage systems 320a, 320b . . . 320n. The applications generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications(Microsoft Excel), financial applications, presentation applications, browser applications, mobile applications, entertainment applications, and so on. The applications may also have the ability to access (e.g., read and write to) data storage systems 320a, 320b . . . 320n using a network file system protocol such as NFS or CIFS. Other programs and applications may facilitate analytical processing of data such as Spark DataFrames and Pandas DataFrames. In one or more embodiments, other applications and programs to facilitate analytical processing of data includes artificial intelligence (AI) and/or machine learning programs, for example, Watson® (registered trademarks of IBM).

As shown, the data storage systems 320a, 320b . . . 320n, the client devices 330a, 330b . . . 330n, and other components in the information management system 300 can be connected to one another via a communication network 310. The communication network 310 can include one or more networks or other connection types including any of following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate wired, wireless, or partially wired/wireless computer or telecommunications networks, combinations of the same or the like. The communication network 310 in some cases may also include application programming interfaces (APIs) including, e.g., cloud service provider APIs, virtual machine management APIs, and hosted service provider APIs.

Figure 4:
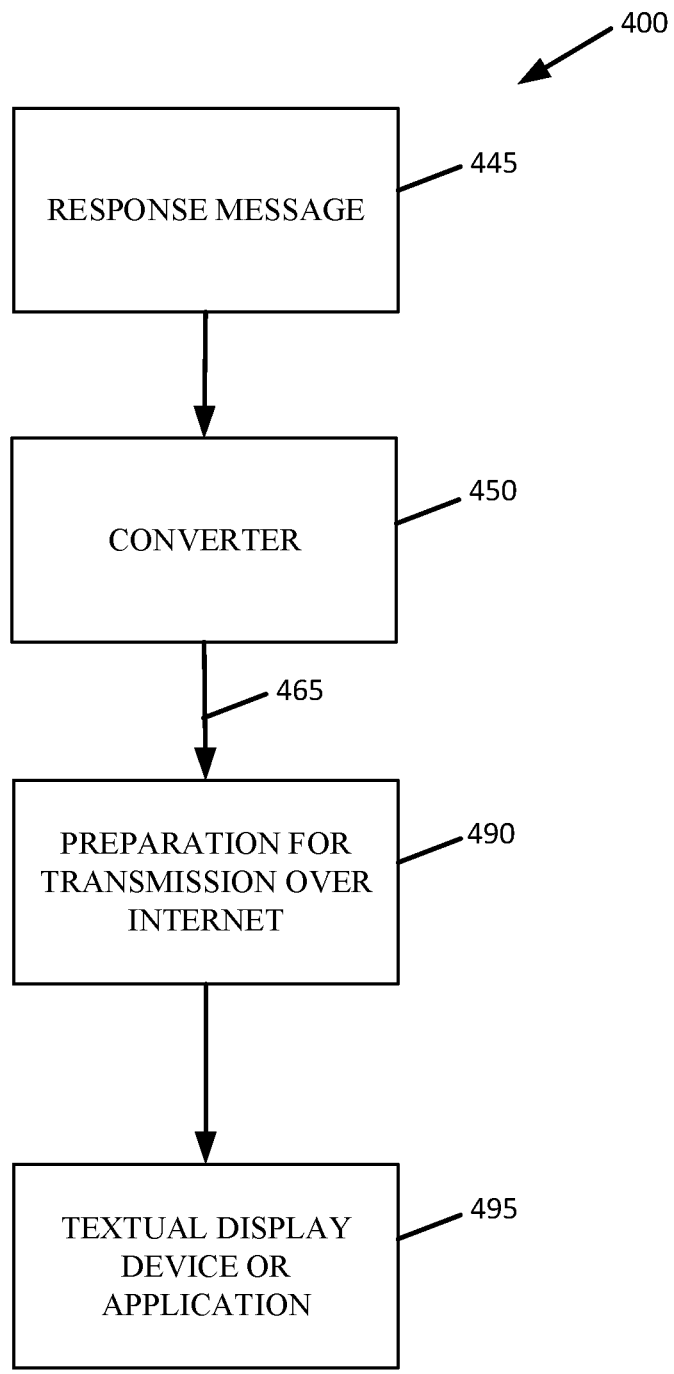
FIG. 4 is a diagrammatic illustration of processing responses or results from applications to non-rich text for display or use in systems and applications, according to an embodiment of the present disclosure.

Referring to FIG. 4, an embodiment of a system, or platform 440, containing in an aspect programming instructions, and/or media containing program instructions, for performing a technique, method, and/or process that translates and/or converts results, e.g. a response message, from for example an analytical program, for transmission to a display device or application, such as for example a "dumb" terminal. System or platform 440 in one or more embodiments includes a Converter 450 that receives response message 445. Converter 450 processes the response message or results from, for example, an analytical program such as, for example, a machine-learning model and/or artificial intelligence model. In one or more embodiments, Converter 450 has the ability to generate and/or translate semantic understanding or meaning into natural language constructs, e.g., into sentences. In one or more aspects, Converter 450 has ability to display semantic understanding in a natural language construct, for example, in sentences. In an embodiment, Converter 450 has the ability to generate, translate, and/or display semantic meaning and understanding into an appropriate display for non-rich text devices and applications. Converter 450, in one or more embodiments, translates the semantic meaning and generates natural language constructs including sentences, and further annotates the translated natural language sentences to convey contextual information and/or semantic meaning. In one or more embodiments, Converter 450 generates, translates, displays, and/or converts the semantic meaning of the response message and/or search results into a natural language sentence suitable for transmission to a device or application that can only use and/or display a non-rich text "blob", where the natural language sentence is annotated to convey contextual information and/or semantic meaning.

Figure 10:
FIG. 10 is an example of converting and annotating a text-rich sentence to an annotated non-rich text sentence according to an embodiment of the present disclosure.

For example, take the results (e.g., the JSON response) of an analytical program, e.g., a machine-learning model, which includes the bolded words (e.g., lexicons) "suspicious"; "related", and "claim" and sentence: "This claim seems suspicious due to similarity to a related claim." How would this sentence be displayed on a device that does not support rich text, e.g., a dumb terminal? And, how would such translation and/or conversion be performed without a custom solution? In one or more embodiments, the same response message and/or search results of the analytical program, which includes the bolded words "suspicious", "related" and "claim", can be processed using Converter 450 as shown in FIG. 10. The Converter 450 in one or more aspects uses a default semantic model to process generic response messages or results (generic JSON response or string) from applications and/or programs, or the Converter 450 can contain and use one or more customized semantic models for a specific response message or specific result of an application and/or program, e.g., machine-learning and/or artificial intelligence model. In one or more embodiments, the format of the results 465, e.g. the format of the resulting string, delivered by the Converter 450 can be modified by adjusting the options, as disclosed in more detail below.

The result or output 465 of Converter 450 is a string customized for simple textual displays, e.g., for a "dumb" terminal, which in one or more embodiments maintains semantic meaning within the textual string. For example, the results or output 465 of Converter 450 is a text "blob" annotated to provide contextual information and/or semantic meaning. At 490 the results or output 465 of Converter 450 is prepared for transmission over the internet and at 495 the result is transmitted to a display device, for example a textual display device that does not support rich-text, or transmitted to an application/program that does not support rich-text display.

Figure 5:
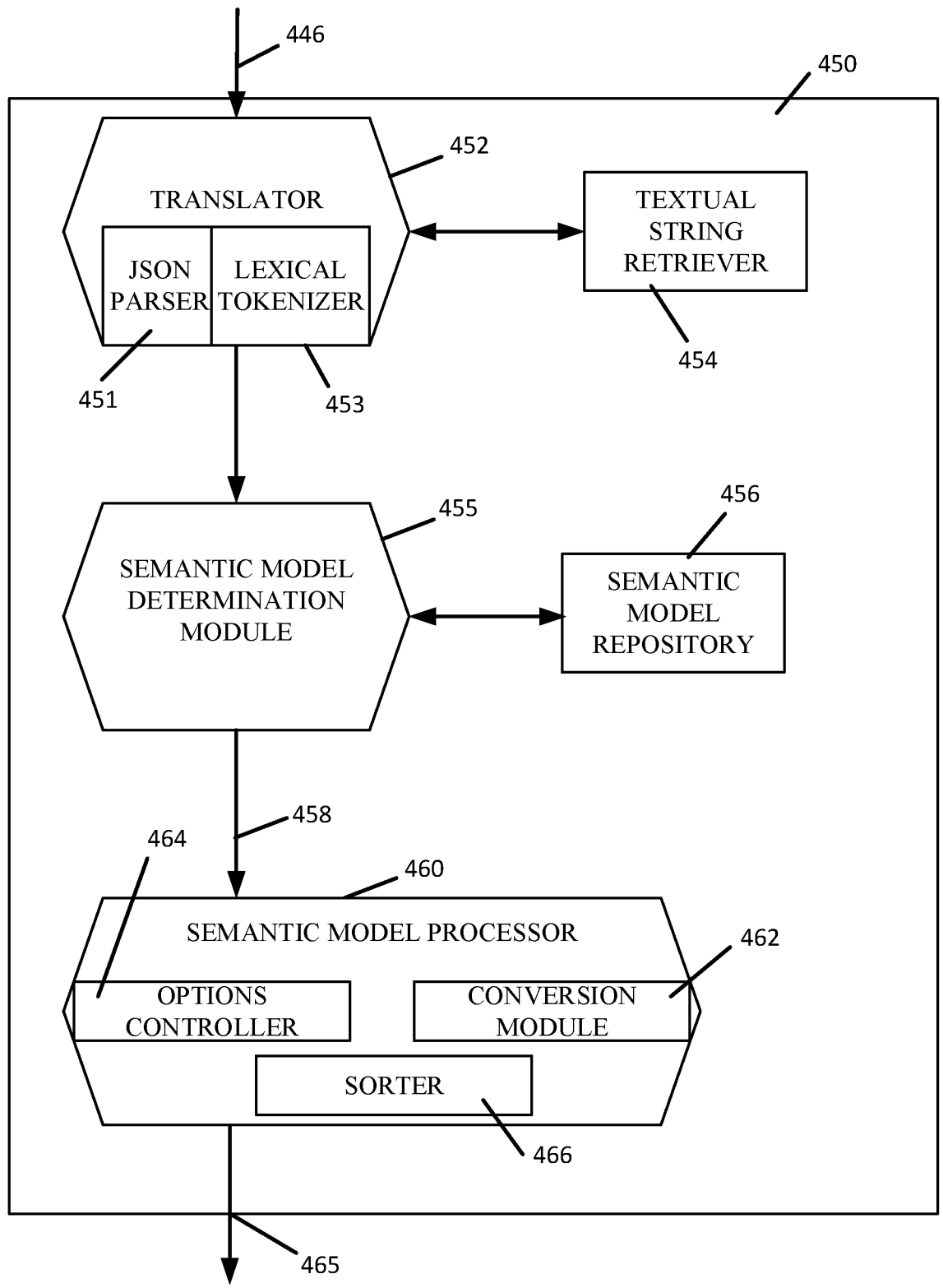
FIG. 5 is an example embodiment of a diagrammatic block diagram of a Converter for processing responses or results from applications to non-rich text for display or use in systems and applications, according to an embodiment of the present disclosure.

Referring now to FIG. 5, an illustrative block diagram of Converter 450 is shown in accordance with an embodiment of the present disclosure in which the results or message response 446 of a program, e.g., an analytical program, such as, for example a machine-learning or artificial intelligence model, is received. Converter 450 includes circuitry and logic to process information, and in one or more embodiments as shown in FIG. 5 includes a Translator Module 452, a Semantic Model Determination Module 455, and a Semantic Model Processor 460.

An analytical program, such as for example a machine learning or artificial intelligence model, typically processes data, for example data stored on information handling system 100, data management system 300, or similar data storage and management systems, and produces results 446, also referred to as its output, its response message, its search results, or results. The response message or results 446 are typically in a Java Script Object Notation (JSON) type format, although the results could be in Extensible Markup Language (XML), or other formats. In one or more embodiments, the output 446 is a JSON formatted string. The output or response message 446, preferably as a JSON formatted string, is supplied to and/or received by Converter 450, more specifically in the embodiment of FIG. 5 the Translator 452. In one or more embodiments, the JSON message, as a default, contains the textual string and semantic understanding of the response message 446, although, in one or more aspects, the response message 446 from the analytical program, also the input 446 to the Converter 450, contains a key value to go look up the response message or input. In a further aspect, the textual string may need to be retrieved.

The Translator 452 contains circuitry and logic to process information, and in an embodiment includes a JSON Parser 451 and Lexical Tokenizer 453. The JSON Parser 451 and Lexical Tokenizer 453 parses the JSON object identifying the string and its corresponding tokens representing the semantic meaning. The Translator 452 in an embodiment parses the JSON response 446 and obtains the individual parts, e.g., the natural language strings for display, and the converted understanding of how to annotate the strings. More specifically, the JSON Parser 451 parses the string into a structured format and the Lexical Tokenizer (or lexical analyzer) 453 goes through the parsed results and picks out the most important elements. The Lexical Tokenizer 453 in an aspect determines what type of data is contained in the JSON message and based upon the type of incoming message will apply a different analyzer to determine what pieces are important and puts the data into a structure so that the semantic model can be chosen. That is, in an embodiment, the response 446 is parsed as necessary to separate out the lexicons of the message from the sentence to be displayed on the target device or application. The JSON message 446 typically contains the textual string and semantic understanding of the response message, but the Translator 452 in one or more embodiments optionally obtains or retrieves the textual string from the Textual String Retriever 454. The JSON Parser 451 in one or more embodiments is widely available and can be a standard module or unit to parse the JSON string into a structured format.

Semantic Model Determination Module 455, containing circuitry and logic for processing information, determines and obtains a semantic model from Semantic Model Repository 456 that corresponds to the JSON message parsed, tokenized, and processed. That is, the Translator 450 processes the response message 446 to facilitate choosing and determining the appropriate semantic model to utilize. Based upon the JSON message identification, the Semantic Model Determination Module 455 looks up the appropriate semantic model from the Semantic Model Repository 456. The semantic model is used to understand the JSON lexicons and how the response message should be processed. The semantic model will have the knowledge of how to process the response message, e.g., the JSON string, in relation to the sentence being generated. The semantic model will use lexicons to convert the sentence. The Semantic Model Repository 456 and Translator 450 can have a default semantic model, and optionally can have one or more semantic models that are specialized for a specific JSON string. The Semantic Model Determination Module 455 obtains the semantic model, e.g., a default semantic model or specialized semantic model, for use on the JSON response parsed and tokenized by the Translator 452.

The Semantic Model Processor 460 receives input 458, including in an embodiment the semantic model and the JSON string, and processes the JSON string against the semantic model and executes the semantic model using the lexicons from the message to translate the natural language sentence based on the options provided. The Semantic Model Processor 460 optionally looks up and translates the string as necessary; converts the string based upon the response and the semantic model; and reorders the result, if necessary. In one or more embodiments, the Semantic Model Processor 460 comprises multiple parts including in an example a Conversion Module 462, an Options Controller 464, and a Sorter 466. The Conversion Module 462 converts the string as specified by the semantic model and puts together the sentence or sentence portions. The Sorter 466 organizes the ordering of the sentence. That is, in an example, the Sorter 466 will reorder the result, if necessary. The Options Controller 464 determines the options available to process the string for optimal display on a specific device or application. The Options Controller 464 for example is used to choose the options to demonstrate highlighting in the sentence. In the example above parenthesis and capitals were chosen to highlight the terms that were bolded, e.g., the terms "suspicious", "related", and "claim", however the Options Controller 464 automatically or through operator input can chose how to annotate and demonstrate highlighting in the sentence. The result or output 465 of the Semantic Model Processor 460 and Converter 450 is a string customized for simple textual displays while maintaining semantic meaning within the textual string. That is, a text "blob" is output by the Converter 450 that preferably requires no further processing on the target device or application.

Figure 6:
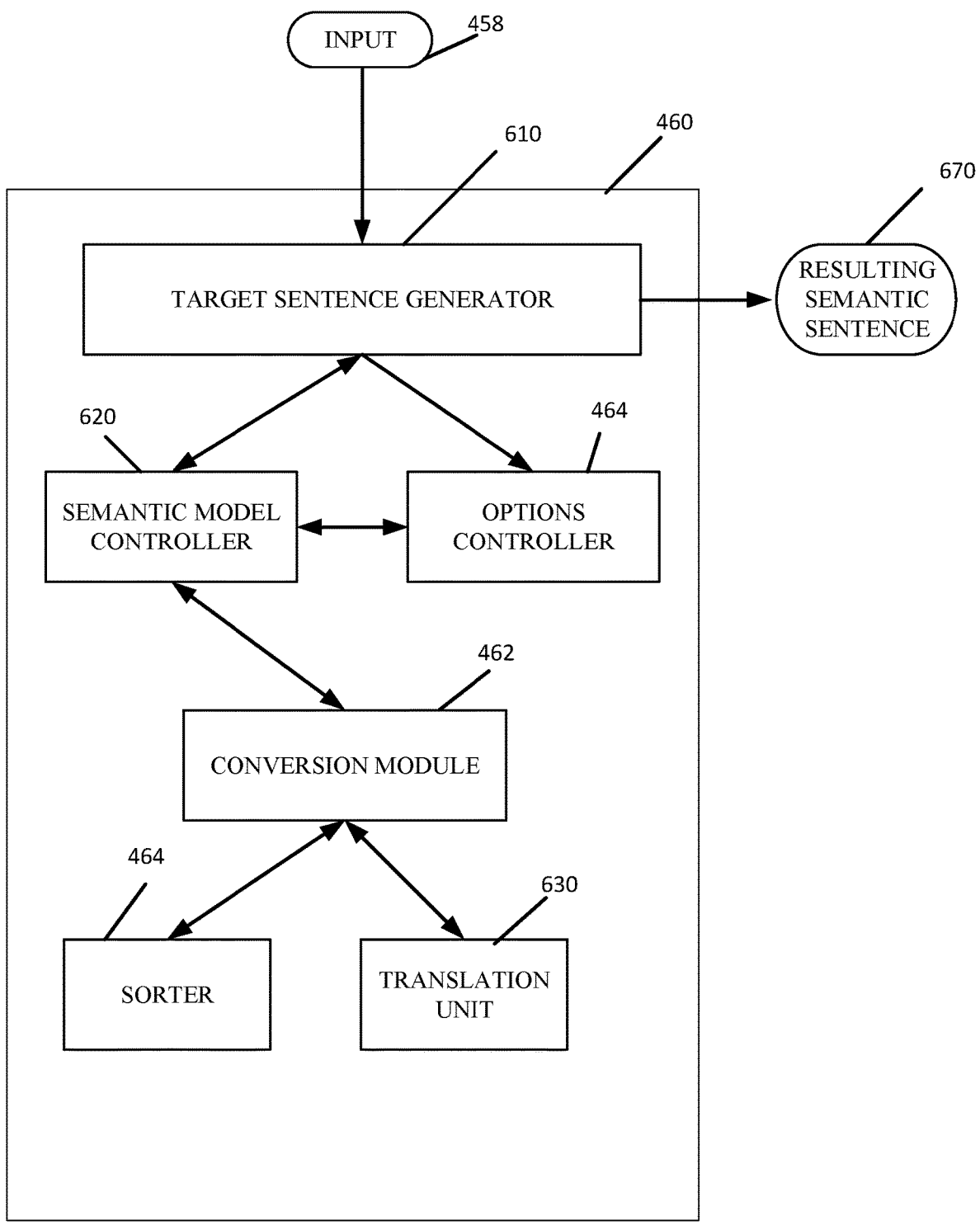
FIG. 6 is an example embodiment of a diagrammatic block diagram of a semantic model processor for converting responses or results from applications, for example analytical processing, to non-rich text for display or use, according to an embodiment of the present disclosure.

FIG. 6 describes in an aspect an example Semantic Model Processor 460 to provide a resulting semantic sentence. Semantic Model processor 460 includes a Target Sentence Generator 610, Semantic Model Controller 620, Options Controller 464, Conversion Module 462, Sorter 464 and Translation Unit 630. Semantic Model Processor 460 receives input 458 typically in the form of the semantic model and/or the response message 446 from the analytical processing application or program. The Target Sentence Generator 610 is responsible for generating the final target sentences. The Semantic Model Controller 820 takes action based upon the semantic model where the Semantic Model Controller 620 interacts with Options Controller 464 to determine the options to implement to annotate and provide semantic meaning to the resulting sentence. The Options Controller 464 in an embodiment allows and/or permits characteristics to be overridden with respect to the target device.

The Conversion Module 462 is responsible for converting the incoming message, e.g., the incoming string, to the target string (sentences). The Conversion Module 462 with Translator Unit 630 translates both the single sentence and/or the set of sentences as necessary for the optioned natural language and the sentences or portions of sentences are reordered by Sorter 464 based upon the semantic understanding. The target sentence generator 610 based upon the processing and conversions performed by the Conversion Module 462 generates the final target sentences at 670, preferably natural language sentences with non-rich text, e.g., text "blobs", with annotated semantic meaning capable of display and use as simple text by dumb terminals that cannot display or use rich-text inputs.

Figure 7:
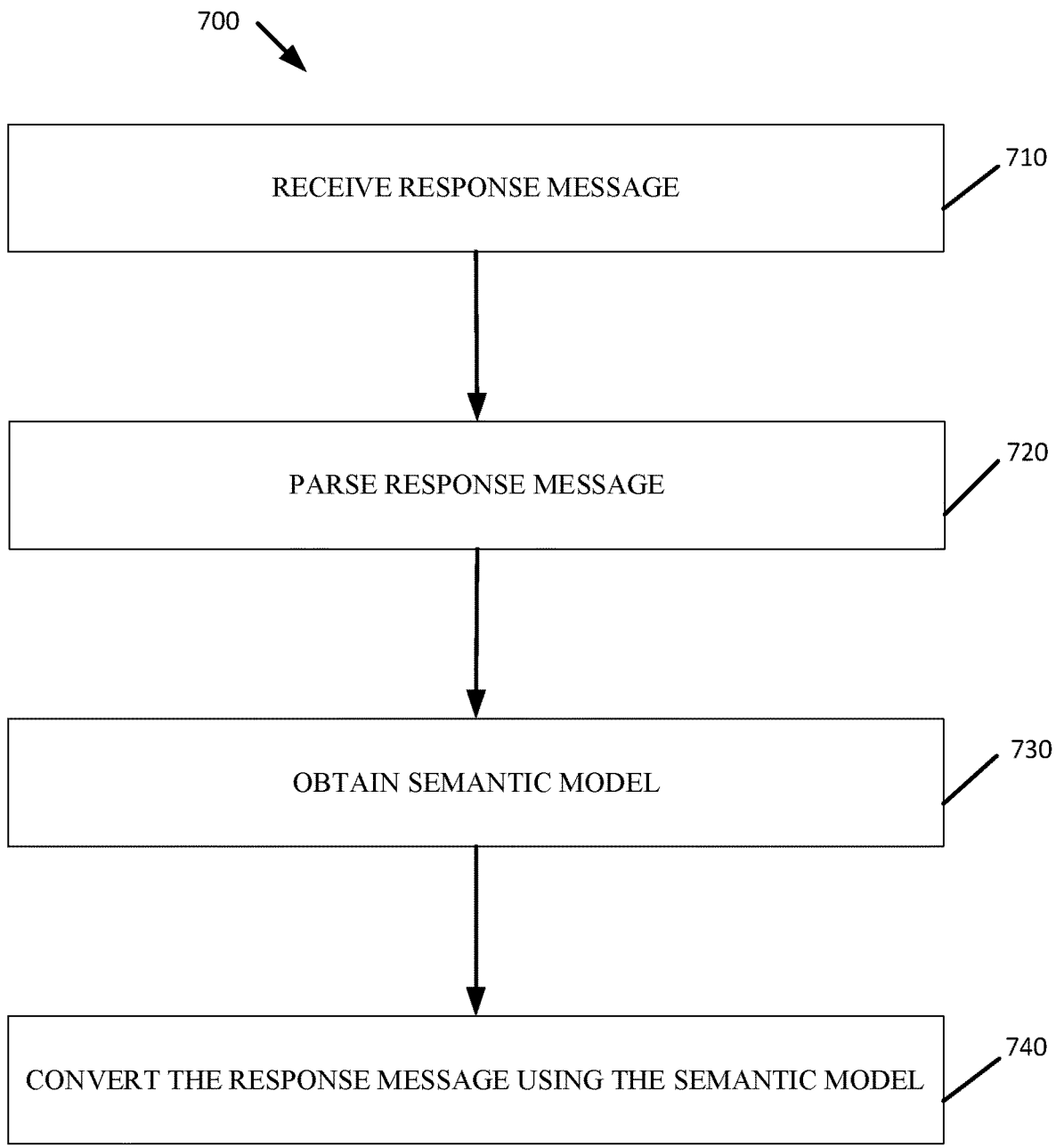
FIG. 7 is an example embodiment of a flow chart illustrating a method and technique for converting responses or results from applications to non-rich text for display or use in systems and applications, according to an embodiment of the present disclosure.

FIG. 7 illustrates an exemplary flowchart in accordance with one or more embodiments illustrating and describing a method of converting a response message into a natural language sentence with non-rich text while maintaining semantic meaning and annotations. While the method 700 shown in FIG. 7 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 7, but the process may be integrated and/or one or more steps may be performed together, simultaneously, or the steps may be performed in the order disclosed or in an alternate order, unless indicated otherwise.

Method or technique 700 starts at 710 with retrieving, receiving, and/or obtaining a response message, in an embodiment a JSON string. The response message is parsed at 720 to obtain its individual parts, e.g., separate the lexicons in the response message from the sentence to be displayed. The semantic model to apply is obtained at 730, and in an example, based upon the identification of the response message, the appropriate semantic model to understand the lexicons and how the response message is to be processed is looked-up, determined, and/or selected. The semantic model in one or more embodiments can be a default semantic model. An embodiment of parsing the response message (720) and obtaining the semantic model (730) is shown and described in more detail with reference to FIG. 8. The semantic model at 740 is used to process the response message, e.g., the JSON string, in relation to the sentence being generated. The semantic model will use the lexicons from the response message, e.g., the JSON string, to convert, translate, and/or reorder the natural language sentence based upon the options provided. The result preferably is a non-rich text blob that is annotated based upon the options selected to demonstrate the semantic meaning. An embodiment of converting the response message using the semantic model (740) is shown and described in more detail with reference to FIG. 9.

Figure 8:
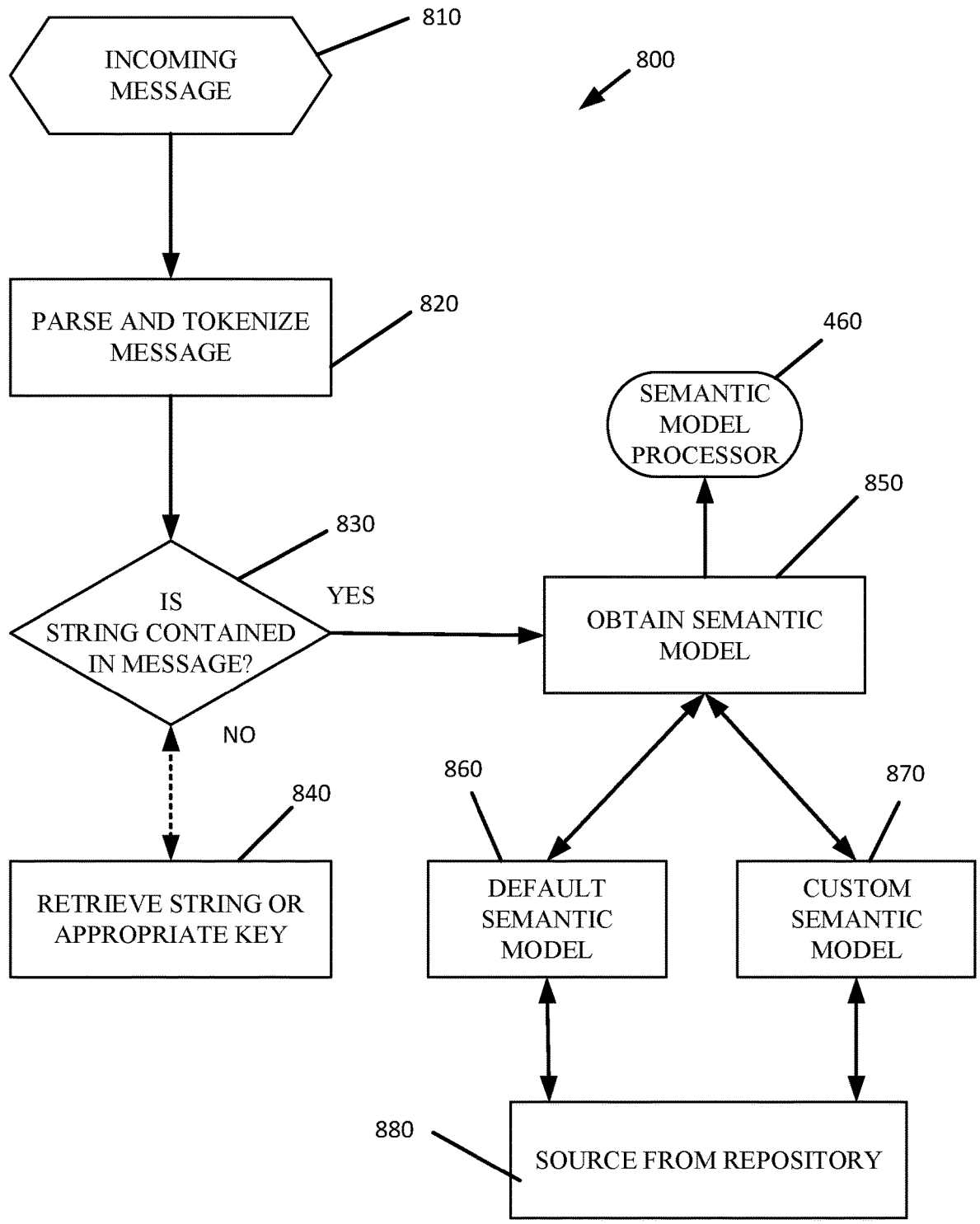
FIG. 8 is an example embodiment of a flow chart illustrating a method and technique for processing responses or results from applications, for example analytical processing, to select a semantic model to apply to convert the responses or results to non-rich text for display or use, according to an embodiment of the present disclosure.

FIG. 8 illustrates an exemplary flowchart in accordance with one or more embodiments illustrating and describing a method of determining and/or obtaining a semantic model for converting a response message into a natural language sentence with non-rich text while maintaining semantic meaning and annotations. While the method 800 shown in FIG. 8 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 8, but the process may be integrated and/or one or more steps may be performed together, simultaneously, or the steps may be performed in the order disclosed or in an alternate order, unless indicated otherwise.

Method or technique 800 starts at 810 with retrieving, receiving, and/or obtaining an incoming message, in an embodiment a JSON format with multiple sections. The incoming message at 810 can be in XML format or other format. In a preferred embodiment, the incoming message is a JSON string. The incoming message at 820 is parsed and tokenized, preferably for example by Translator 452, which in an embodiment includes Parser 451 and Tokenizer 453. The message at 820 is broken into appropriate parts, e.g., tokens. At 830 it is determined if the output string is contained in the incoming message or needs to be retrieved, and if the output string is not contained in the message (830: No), then at 840 optionally the string (or sentence(s)) is retrieved, for example using the textual string retriever 454. In an embodiment, instead of retrieving the string at 840, an appropriate key identifying where the string is located is retrieved, and in an aspect the string is retrieved using the key. If at 830 it is determined that the string is contained in the incoming message (830: Yes), then the process proceeds to 850 where the semantic model is obtained. In one or more embodiments, a controller at 850 obtains the appropriate semantic model. At 860 a default semantic model is retrieved which is the more common approach, or at 870 a custom semantic model is retrieved. The default semantic model and/or custom semantic model can in an aspect be retrieved or sourced by the controller from a repository. The custom semantic model selected at 870 can be specialized for the incoming message. The semantic model repository 456 can be optionally employed and implemented. For example, where only a default semantic model is implemented, sourcing from repository 456 at 880 may not be necessary and/or performed.

Figure 9:
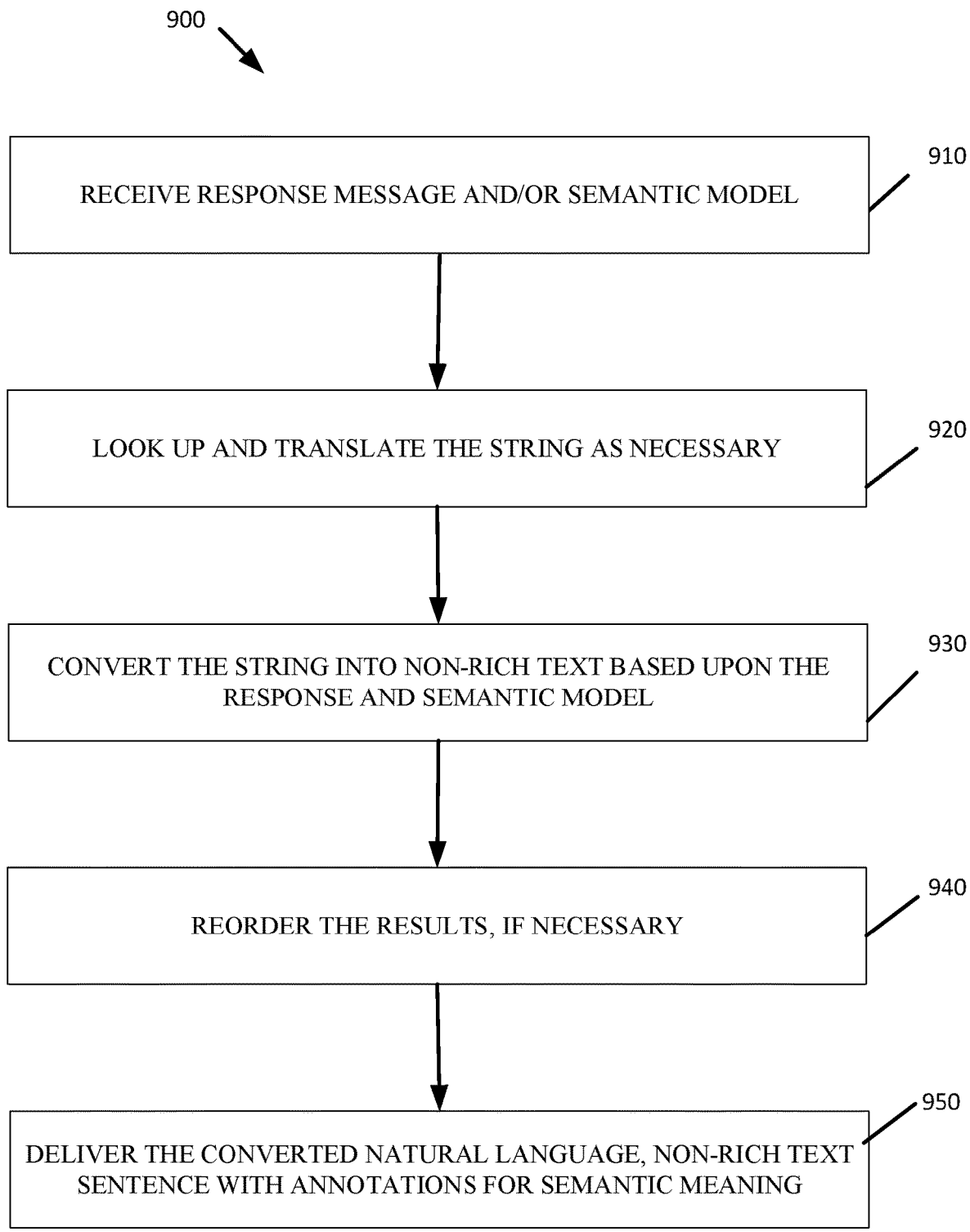
FIG. 9 is an example embodiment of a flow chart illustrating a method and technique for processing a message response to non-rich text for display or use, according to an embodiment of the present disclosure

FIG. 9 illustrates an exemplary block diagram and flowchart 900 in accordance with one or more embodiments illustrating and describing a method of executing, implementing, and/or using a semantic model for converting a response message into a natural language sentence with non-rich text while maintaining semantic meaning and annotations. While the method 900 shown in FIG. 9 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 9, but the process may be integrated and/or one or more steps may be performed together, simultaneously, or the steps may be performed in the order disclosed or in an alternate order, unless indicated otherwise.

In one or more embodiments the method or technique 900 of executing, implementing, and/or using a semantic model to convert a response message, from for example a machine-learning, artificial intelligence, and/or other analytical processing model, into a natural language output with non-rich text (e.g., a text blob) while retaining semantic meaning through text annotation is the second portion of the method 800 of selecting, determining, and/or obtaining an appropriate semantic model for translating and converting an incoming response message from the analytical processing model. In method 900, the semantic model processor in an embodiment at 910 receives or already is provided with the semantic model (or information to obtain the semantic model) and in an aspect receives or already is provided with the response message.

At 920 the string is looked-up and/or translated/converted, as necessary, based upon and as specified by the semantic model selected (or the default semantic model). At 930 the resulting translated string is converted from a rich-text format, e.g., HTML format, to a non-rich text format or sentence(s) based upon the response message, e.g., JSON message, and/or the semantic model to convey the contextual information and/or semantic meaning. In this regard, the options controller can determine how the natural language, non-rich text sentence is annotated to show the semantic meaning. The results of the translation and/or conversion are reordered if necessary at 940, and the converted natural language, non-rich text sentence(s) with annotations for semantic meaning preferably are delivered at 950.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of processing an electronic response message by a processor from a computer-implemented analytical application, the method comprising:

receiving by the processor the electronic response message in the form of a JSON group consisting of at least one of a JSON string, a JSON object, a key to locate a JSON string, a key to locate a JSON object, and combinations thereof, and wherein receiving by the processor the electronic message comprises at least one of a group consisting of receiving the JSON group by the processor, providing the JSON group by the processor, obtaining the JSON group by the processor, and combinations thereof;

parsing by the processor the JSON string or JSON object associated with electronic response message to facilitate selecting a computer-implemented semantic model to translate the electronic response message;

separating by the processor tokens in the JSON string or JSON object representing the semantic meaning from a sentence for use or display;

obtaining by the processor the computer-implemented semantic model to translate the JSON string or JSON object associated with the electronic response message;

translating by the processor the JSON string or JSON object associated with the using the computer-implemented semantic model;

converting by the processor the translated JSON string or JSON object associated with the electronic response message to electronic non-rich text;

forming by the processor the converted electronic non-rich text to natural language sentences having electronic non-rich text;

annotating by the processor the natural language sentences having electronic non-rich text for semantic meaning; and delivering by the processor the natural language sentences having electronic non-rich text annotated for semantic meaning to at least one of a group consisting of an electronic display, and for electronic transmission outside the processor.

2. The method of claim 1, further comprising reordering by the processor the electronic non-rich text.

3. The method of claim 1, further comprising parsing by the processor the JSON string or JSON object associated with the electronic response message to separate tokens providing the semantic meaning from the JSON string or JSON object associated with the electronic response message.

4. The method of claim 1, further comprising determining by the processor whether the electronic response message contains a JSON string or a JSON object, and in response to the electronic response message not containing the JSON string or not containing the JSON object retrieving by the processor the JSON string, the JSON object, or an appropriate key to retrieve the JSON string or JSON object.

5. The method of claim 1, further comprising selecting by the processor a specialized computer-implemented semantic model based upon the JSON string or JSON object associated with the electronic response message from a semantic model repository.

6. The method of claim 1, further comprising selecting by the processor a default semantic model based upon the JSON string or the JSON object associated with the electronic response message.

7. A system for processing an electronic response message from a computer-implemented analytical application, the system comprising:
- a hardware processor for processing programming instructions;
- a converter for converting by the processor an incoming electronic response message to a natural language, non-rich text sentence, wherein the incoming electronic response message is in the form of a JSON group consisting of at least one of a JSON string, a JSON object, a key to locate a JSON string, a key to locate a JSON object, and combinations thereof, the converter comprising:
  - a translator for separating tokens by the processor for providing semantic meaning from the incoming JSON group;
  - a semantic model determination module for selecting a computer-implemented semantic model for processing the JSON string or JSON object associated with the incoming electronic response message; and
  - a semantic model processor to convert the incoming electronic response message to natural language non-rich electronic text sentences;

wherein the converter in association with the hardware processor is configured to:
- receive the incoming electronic response message;
- parse the JSON String or JSON object associated with the incoming electronic response message, by the translator in association with the hardware processor, to facilitate selecting a computer-implemented semantic model to translate the JSON string or JSON object associated with the incoming electronic response message;
- obtain, by the semantic model determination module in association with the hardware processor, the computer-implemented semantic model to translate the JSON string or JSON object associated with the incoming electronic response message;
- translate, by the computer-implemented semantic model processor in association with the hardware processor, the JSON string or JSON object associated with the incoming electronic response message using the computer-implemented semantic model;
- convert, by the semantic model processor in association with the hardware processor, the translated JSON string or JSON object associated with the electronic response message to non-rich electronic text;
- annotate, by the hardware processor in association with the semantic model processor, the non-rich electronic text for semantic meaning wherein the non-rich text annotated for semantic meaning is for electronic transmission or electronic display; and
- deliver the converted electronic non-rich text as natural language sentence with annotations for semantic meaning for display on a dumb terminal without further processing.

8. The system of claim 7, wherein the translator in association with the hardware processor is further configured to determine whether the incoming JSON group contains a JSON string or a JSON object, and in response to the incoming JSON group not containing the JSON string or not containing the JSON object, retrieving the JSON string, the JSON object, or an appropriate key to retrieve the JSON string or the JSON object.

9. The system of claim 7, wherein the semantic model determination module further comprises a semantic model repository for containing one or more computer-implemented semantic models, and the semantic model determination module in association with the hardware processor is further configured to select one of a group consisting of a default computer-implemented semantic model and a specialized computer-implemented semantic model based upon the JSON string or JSON object associated with the incoming electronic response message.

10. The system of claim 7, wherein the semantic model determination module in association with the hardware processor is further configured to select a default computer-implemented semantic model based upon the JSON string or JSON object associated with the incoming electronic response message.

11. The system of claim 7, wherein the semantic model processor further comprises a conversion module for converting a JSON string or a JSON object to at least a portion of a natural language sentence, and a target sentence generator for generating the final target natural language non-rich electronic text sentences annotated for semantic meaning, and the semantic model processor in association with the hardware processor is configured to process a JSON string or a JSON object to create natural language non-rich electronic text sentences annotated for semantic meaning.

12. The system of claim 7, wherein the semantic model processor in association with the hardware processor is further configured to look up and translate the JSON string or JSON object associated with the incoming electronic response message.

13. The system of claim 12, wherein the converter in association with the hardware processor is further configured to convert the translated JSON string or JSON object based upon the computer-implemented semantic model and the JSON string or JSON object associated with the incoming electronic response message.

\* \* \* \* \*